(12) United States Patent
Wu

(10) Patent No.: US 8,777,175 B2
(45) Date of Patent: Jul. 15, 2014

(54) ELECTRONIC DEVICE SUPPORTING MECHANISM

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 272 days.

(21) Appl. No.: 13/222,442

(22) Filed: Aug. 31, 2011

(65) Prior Publication Data

US 2013/0015310 A1 Jan. 17, 2013

(30) Foreign Application Priority Data

Jul. 15, 2011 (TW) .............................. 100125118 A

(51) Int. Cl.
| | |
|---|---|
| *A47B 91/00* | (2006.01) |
| *A47G 29/00* | (2006.01) |
| *B65D 19/00* | (2006.01) |
| *H05K 5/00* | (2006.01) |
| *H05K 7/00* | (2006.01) |
| *G06F 1/16* | (2006.01) |

(52) U.S. Cl.
USPC ............ 248/346.06; 248/346.03; 248/346.07; 361/679.01; 361/679.08; 361/679.09

(58) Field of Classification Search
USPC ........... 248/688, 442.2, 447, 447.1, 917, 918; 361/724–727, 679.01–679.61
See application file for complete search history.

(56) References Cited

U.S. PATENT DOCUMENTS

| | | | | |
|---|---|---|---|---|
| 5,548,478 A | * | 8/1996 | Kumar et al. | ............ 361/679.27 |
| 6,515,852 B2 | * | 2/2003 | Huang et al. | ............ 361/679.08 |
| 7,206,198 B2 | * | 4/2007 | Wang | ....................... 361/679.55 |

* cited by examiner

*Primary Examiner* — Jonathan Liu
*Assistant Examiner* — Taylor Morris
(74) *Attorney, Agent, or Firm* — Tracy M. Heims; Apex Jurls, Pllc

(57) ABSTRACT

An electronic device supporting mechanism includes a base, a top cover, a first supporting member and a second supporting member. The first supporting member and the second supporting member are rotatable relative to the base to a supporting position or a storing position. In a case that the first supporting member and the second supporting member are rotated to the supporting portion, an electronic device can be supported. Whereas, in a case that the first supporting member and the second supporting member are rotated to the storing position, the first supporting member and the second supporting member are respectively stored within two receiving spaces of the base. The electronic device supporting mechanism is advantageous for protecting the supporting components and is easily carried.

14 Claims, 10 Drawing Sheets

ELECTRONIC DEVICE SUPPORTING MECHANISM

FIELD OF THE INVENTION

The present invention relates to an electronic device supporting mechanism, and more particularly to an electronic device supporting mechanism applicable to a portable computer and a portable communication device.

BACKGROUND OF THE INVENTION

Portable computers such as tablet computers are thin and light to be carried by the users and have computing capability similar to the general personal computers. Consequently, portable computers are gradually loved by the user and widely found in the market. Generally, during operations, the tablet computer lies flat on the desk surface. For adjusting the tilt angle of the tablet computer, the tablet computer should be leant against other supporting article so as to be supported by the supporting article. The way of supporting the tablet computer is troublesome because it is time-consuming for the user to find out the proper supporting article. Since the tablet computer is not equipped with a physical keyboard, characters are inputted into the tablet computer by using the virtual keyboard shown on the touch screen, or in a handwriting means, or in a voice input means. Due to the size limitation of the tablet computer, the virtual keyboard is usually very small. In addition, since the arrangement of the virtual keyboard is different from the general keyboard, it is inconvenient to operate the virtual keyboard. Whereas, the character recognition rate of the tablet computer in the handwriting means or the voice input means is usually unsatisfied. In most circumstances, the user needs to correct the character shown on the virtual keyboard or even re-enter the character. For solving these drawbacks, many supporting devices and external keyboards for the tablet computers have been introduced into the market.

Please refer to FIGS. 1A, 1B and 1C. FIG. 1A is a schematic exploded view illustrating an electronic device supporting mechanism according to the prior art. FIG. 1B is a schematic perspective view illustrating the electronic device supporting mechanism of FIG. 1A and located at a supporting position. FIG. 1C is a schematic perspective view illustrating the electronic device supporting mechanism of FIG. 1A and located at a storing position. The supporting mechanism as shown in FIGS. 1A, 1B and 1C is disclosed in for example U.S. Pat. No. 7,059,576.

As shown in FIG. 1A, the electronic device supporting mechanism 1 comprises a base 11, a supporting arm 12, a stepless shaft 13, a supporting block 14, a supporting plate 15 and a keyboard 16. The base 11 comprises a first pivoting structure 11a, a second pivoting structure 11b and a receptacle 11c. The supporting arm 12 comprises a first pivotal end 12a, a fixing part 12b and two sliding grooves 12c. The supporting plate 15 comprises a first coupling part 15a and a second coupling part 15b.

Please also refer to FIG. 1B. The supporting arm 12 is pivotally coupled to the first pivoting structure 11a of the base 11 through the first pivotal end 12a. The stepless shaft 13 is disposed on the fixing part 12b of the supporting arm 12. The supporting block 14 is disposed on the stepless shaft 13. The both ends of the first coupling part 15a at the upper edge of the supporting plate 15 are inserted into the sliding grooves 12c of the supporting arm 12. The second coupling part 15b at the lower edge of the supporting plate 15 is pivotally coupled to the second pivoting structure 11b of the base 11. The keyboard 16 is accommodated within the receptacle 11c of the base 11.

In a case that the electronic device supporting mechanism 1 is located at the supporting position (as shown in FIG. 1B), an electronic device may be placed on the supporting block 14. In addition, by adjusting the angle of the supporting block 14 through the stepless shaft 13, the viewing angle of the electronic device is changeable.

In a case that the electronic device supporting mechanism 1 is no longer used by the user, the both ends of the first coupling part 15a at the upper edge of the supporting plate 15 are moved downwardly along the sliding grooves 12c, and then the supporting arm 12 is pressed down until the supporting plate 15 and the supporting arm 12 are both in close contact with the base 11. Then, the supporting block 14 is rotated to lie flat on the supporting plate 15 (see FIG. 1C). Under this circumstance, the electronic device supporting mechanism 1 is located at the storing position.

From the above discussion, the electronic device supporting mechanism 1 is capable of supporting the external electronic device through the supporting arm 12, the supporting block 14 and the supporting plate 15 and capable of adjusting the viewing angle of the electronic device through the stepless shaft 13.

However, the conventional electronic device supporting mechanism still has some drawbacks. For example, the supporting arm, the stepless shaft, the supporting block, the supporting plate and the keyboard of the conventional electronic device supporting mechanism are all exposed outside. Consequently, during the process of carrying and moving the electronic device supporting mechanism, the supporting arm, the stepless shaft, the supporting block, the supporting plate or the keyboard is possibly entangled by other foreign articles and the problem is difficultly found by the user. When the electronic device supporting mechanism is removed by the user, the foreign article is readily hurt, or even the supporting arm, the stepless shaft, the supporting block or the supporting plate is suffered from deformation fracture, or the keys of the keyboard are detached. Moreover, the symbols marked on the keys of the keyboard are possibly worn away and difficult to be identified. Under this circumstance, the use life and the carrying convenience of the electronic device supporting mechanism will be impaired.

Therefore, there is a need of providing an improved electronic device supporting mechanism so as to obviate the drawbacks encountered from the prior art.

SUMMARY OF THE INVENTION

The present invention provides an electronic device supporting mechanism with a keyboard function and a protecting function.

The present invention also provides an electronic device supporting mechanism that is easily carried.

In accordance with an aspect of the present invention, there is provided an electronic device supporting mechanism. The electronic device supporting mechanism includes a base, a top cover, a first supporting member and a second supporting member. The base includes a first receiving space and a second receiving space. The first receiving space is located at a corner of a first edge and a second edge of the base. The second receiving space is located at a corner of the first edge and a third edge of the base. The second edge and the third edge are respectively perpendicular to both ends of the first edge. The top cover includes a first cover body and a second cover body. The first cover body is disposed on the base and rotatable relative to the base. The second cover body is pivotally coupled to the first cover body. The second cover body is rotatable relative to the first cover body. The first supporting member includes a first side plate, a second side plate and at least one first notch. A first angle is defined between the first side plate and the second side plate. The first notch is formed in the first side plate. The first supporting member is pivotally coupled to the first receiving space, so that the first supporting member is rotated to a first supporting position or a first storing position relative to the base. The second supporting member includes a third side plate, a fourth side plate and at least one second notch. A second angle is defined between the third side plate and the fourth side plate. The second notch is formed in the third side plate. The second supporting member is pivotally coupled to the second receiving space, so that the second supporting member is rotated to a second supporting position or a second storing position relative to the base.

In an embodiment, the first angle and the second angle are both 90 degrees.

In an embodiment, a first protruding shaft is further disposed within the first receiving space, and a second protruding shaft is further disposed within the second receiving space. The first protruding shaft is located at a connecting region between the first edge and the second edge of the base. The second protruding shaft is located at a connecting region between the first edge and the third edge of the base.

In an embodiment, the first supporting member further includes a first pivotal hole, and the second supporting member further includes a second pivotal hole. The first protruding shaft is penetrated through the first pivotal hole. The second protruding shaft is penetrated through the second pivotal hole.

In an embodiment, when the first supporting member is located at the first supporting position, the first side plate of the first supporting member is parallel with the second edge of the base, and the second side plate of the first supporting member is parallel with the first edge of the base. Whereas, when the first supporting member is located at the first storing position, the first side plate of the first supporting member is parallel with the first edge of the base, and the second side plate of the first supporting member is parallel with the second edge of the base.

In an embodiment, when the second supporting member is located at the second supporting position, the third side plate of the second supporting member is parallel with the third edge of the base, and the fourth side plate of the second supporting member is parallel with the first edge of the base. Whereas, when the second supporting member is located at the second storing position, the third side plate of the second supporting member is parallel with the first edge of the base, and the fourth side plate of the second supporting member is parallel with the third edge of the base.

In an embodiment, the first supporting member further includes a first attractable element and a second attractable element, and the second supporting member further includes a third attractable element and a fourth attractable element. The first attractable element is disposed on the first side plate of the first supporting member. The second attractable element is disposed on the second side plate of the first supporting member. The third attractable element is disposed on the third side plate of the second supporting member. The fourth attractable element is disposed on the fourth side plate of the second supporting member.

In an embodiment, the first attractable element, the second attractable element, the third attractable element and the fourth attractable element are iron parts.

In an embodiment, a fifth attractable element is further disposed within the first receiving space, and a sixth attractable element is further disposed within the second receiving space.

In an embodiment, the fifth attractable element and the sixth attractable element are both magnetic elements.

In an embodiment, when the first supporting member is located at the first supporting position, the second attractable element is magnetically attracted by the fifth attractable element. When the first supporting member is located at the first storing position, the first attractable element is magnetically attracted by the fifth attractable element.

In an embodiment, when the second supporting member is located at the second supporting position, the fourth attractable element is magnetically attracted by the sixth attractable element. Whereas, when the second supporting member is located at the second storing position, the third attractable element is magnetically attracted by the sixth attractable element.

In an embodiment, the base further includes a recess for receiving an electronic device.

In an embodiment, the base further includes a keyboard.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an electronic device supporting mechanism. The electronic device supporting mechanism is applied to a portable electronic device.

Figure 1A:
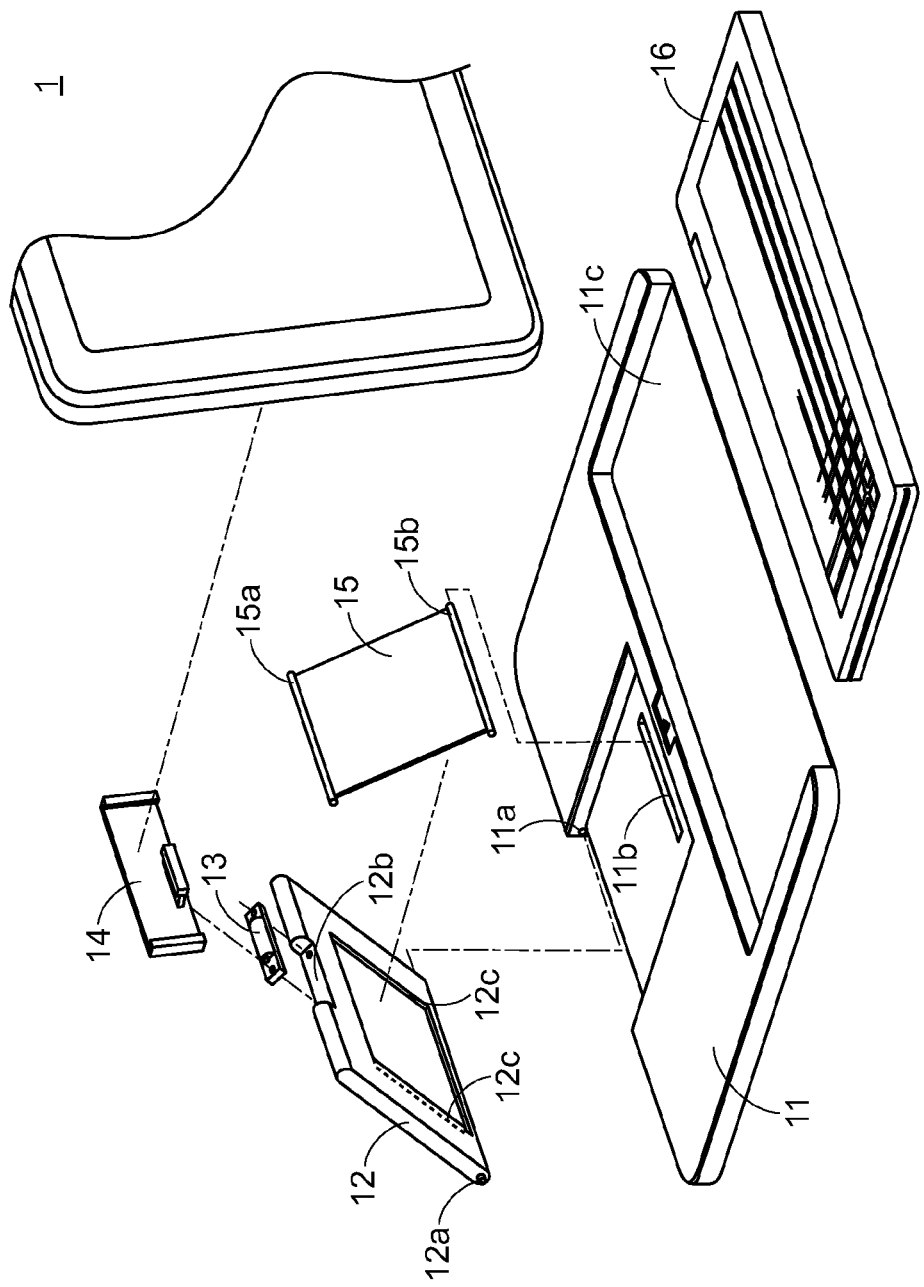
FIG. 1A is a schematic exploded view illustrating an electronic device supporting mechanism according to the prior art.
Figure 1B:
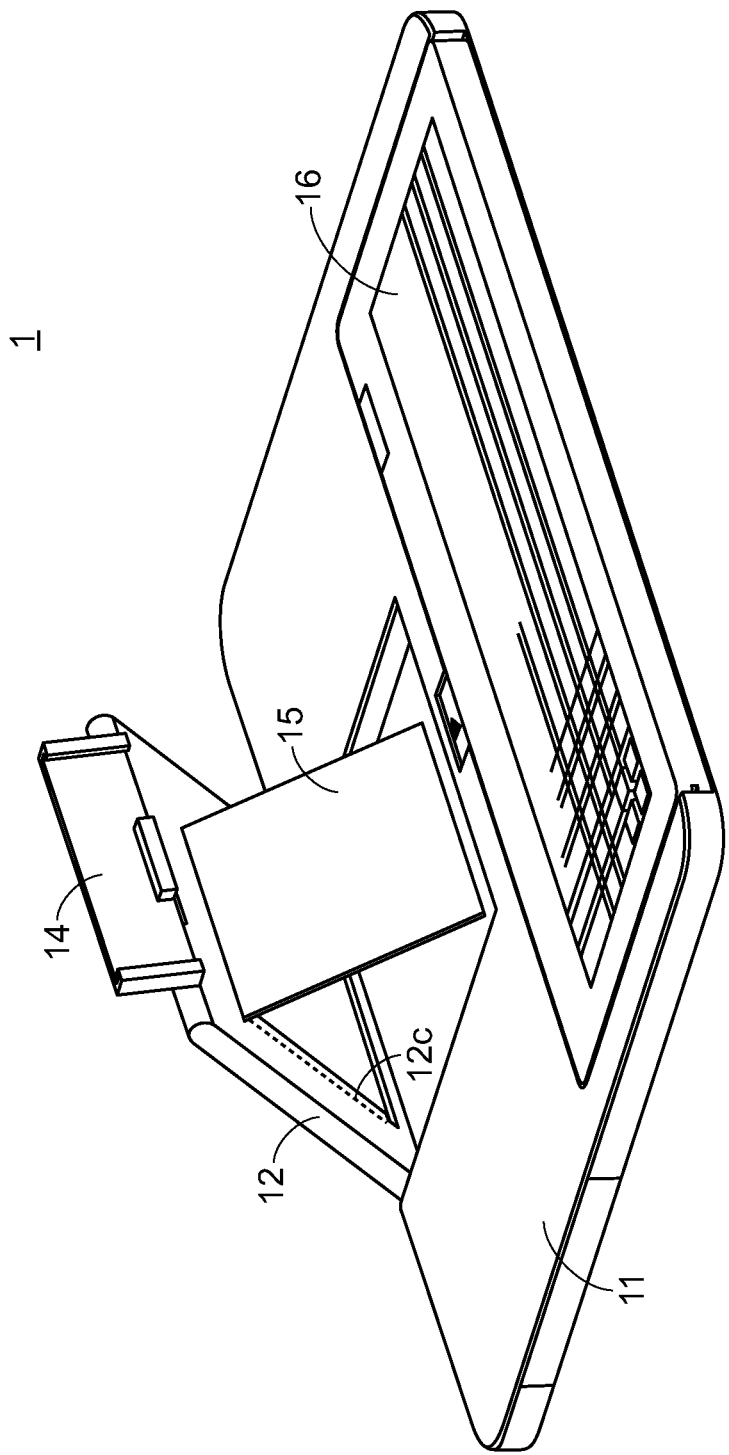
FIG. 1B is a schematic perspective view illustrating the electronic device supporting mechanism of FIG. 1A and located at a supporting position.
Figure 1C:
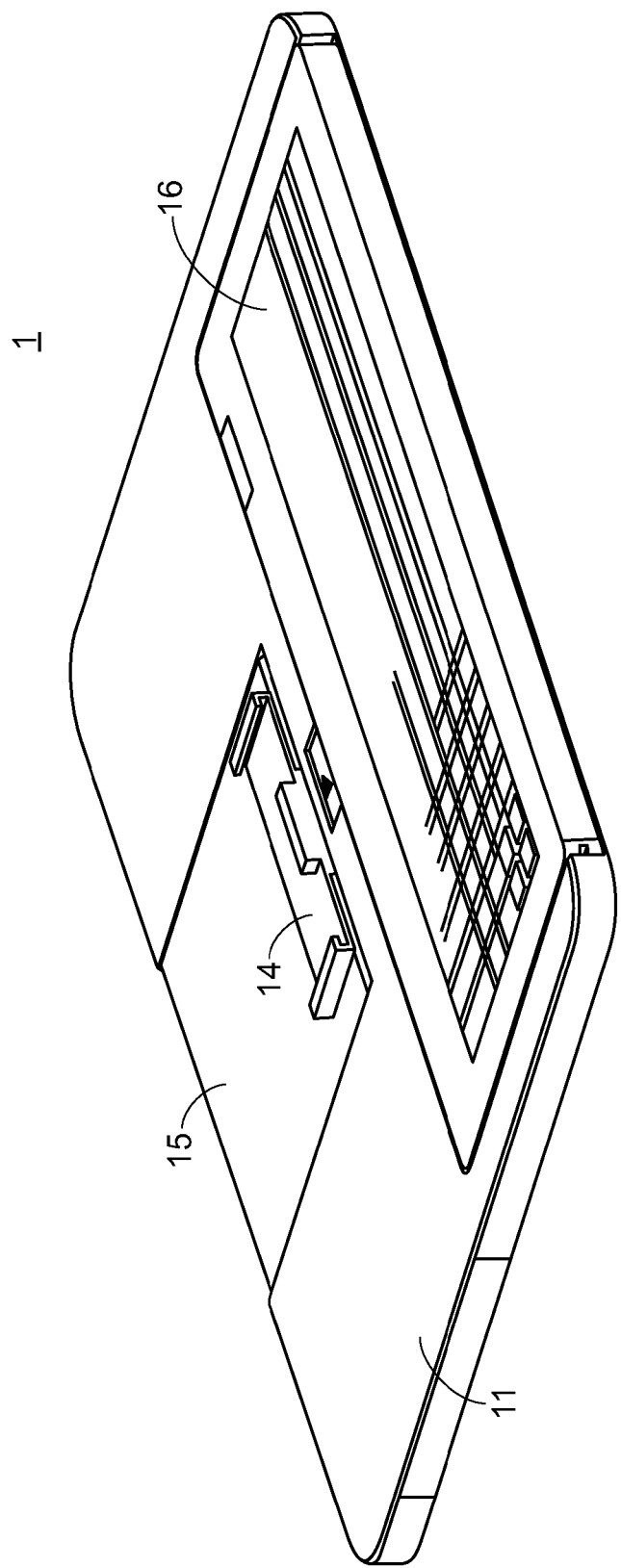
FIG. 1C is a schematic perspective view illustrating the electronic device supporting mechanism of FIG. 1A and located at a storing position.
Figure 2A:
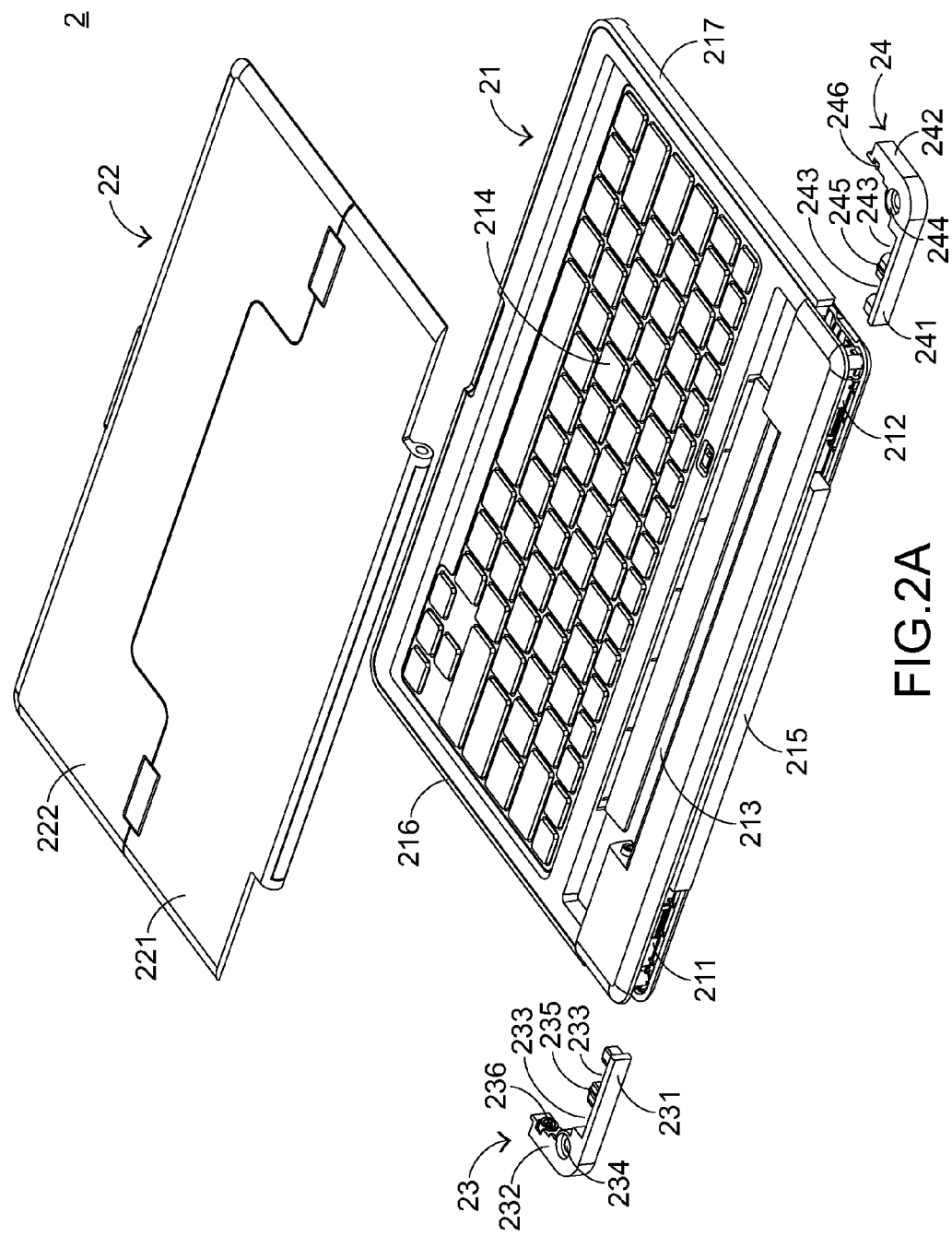
FIG. 2A is a schematic exploded view illustrating an electronic device supporting mechanism according to an embodiment of the present invention.

FIG. 2A is a schematic exploded view illustrating an electronic device supporting mechanism according to an embodiment of the present invention. As shown in FIG. 2A, the electronic device supporting mechanism 2 comprises a base 21, a top cover 22, a first supporting member 23 and a second supporting member 24.

Figure 2B:
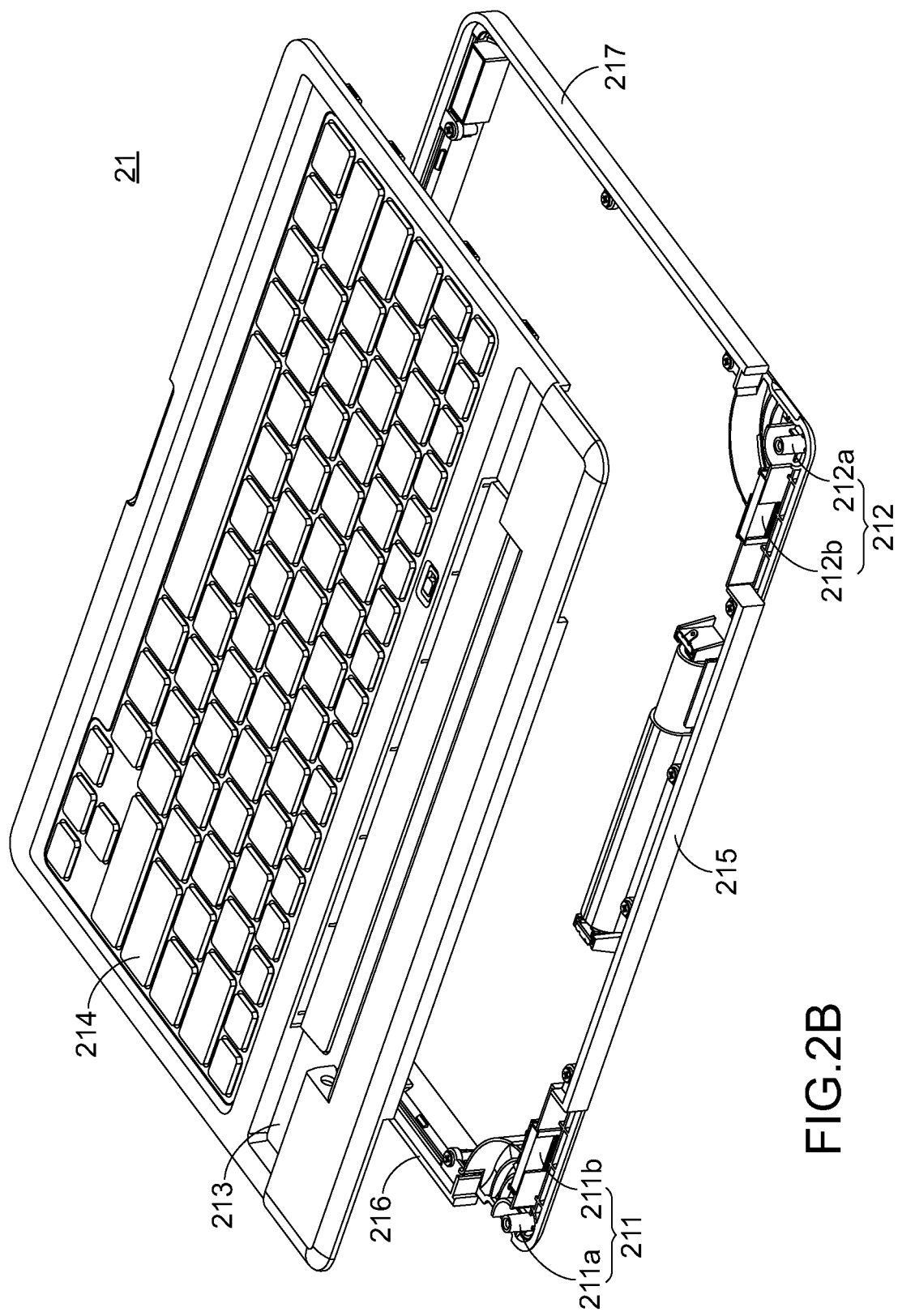
FIG. 2B is a schematic exploded view illustrating the base of the electronic device supporting mechanism according to the embodiment of the present invention.

Please also refer to FIG. 2B. FIG. 2B is a schematic exploded view illustrating the base of the electronic device supporting mechanism according to the embodiment of the present invention. The base 21 comprises a first receiving space 211, a second receiving space 212, a recess 213 and a keyboard 214. A first protruding shaft 211a and a fifth attractable element 211b are disposed within the first receiving space 211. A second protruding shaft 212a and a sixth attractable element 212b are disposed within the second receiving space 212. The top cover 22 comprises a first cover body 221 and a second cover body 222. The first supporting member 23 has a first side plate 231, a second side plate 232, two first notches 233, a first pivotal hole 234, a first attractable element 235 and a second attractable element 236. The second supporting member 24 comprises a third side plate 241, a fourth side plate 242, two second notches 243, a second pivotal hole 244, a third attractable element 245 and a fourth attractable element 246.

A process of assembling the electronic device supporting mechanism 2 according to the embodiment of the present invention will be illustrated as follows. Firstly, a base 21 including at least a first edge 215, a second edge 216 and a third edge 217 is provided, wherein the second edge 216 and the third edge 217 are perpendicular to the first edge 215. The first receiving space 211 is located at the corner of the first edge 215 and the second edge 216 of the base 21. The first protruding shaft 211a is disposed within the first receiving space 211, and located at a connecting region between the first edge 215 and the second edge 216. The fifth attractable element 211b is accommodated within the first receiving space 211 and parallel with the first edge 215 of the base 21. The second receiving space 212 is located at the corner of the first edge 215 and the third edge 217 of the base 21. The second protruding shaft 212a is disposed within the second receiving space 212, and located at a connecting region between the first edge 215 and the third edge 217. The sixth attractable element 212b is accommodated within the second receiving space 212 and parallel with the first edge 215 of the base 21. The recess 213 and the keyboard 214 are located at the top surface of the base 21. Then, a first side of the first cover body 221 of the top cover 22 is pivotally coupled to the base 21, and the second cover body 222 is pivotally coupled to a second side of the first cover body 221. A first angle between the first side plate 231 and the second side plate 232 of the first supporting member 23 is 90 degrees. The two first notches 233 and the first attractable element 235 are located at the first side plate 231. The second attractable element 236 is located at the second side plate 232. The first protruding shaft 211a within the first receiving space 211 is penetrated through the first pivotal hole 234, so that the first supporting member 23 is pivotally coupled to the first receiving space 211. A second angle between the third side plate 241 and the fourth side plate 242 of the second supporting member 24 is 90 degrees. The two second notches 243 and the third attractable element 245 are located at the third side plate 241. The fourth attractable element 246 is located at the fourth side plate 242. The second protruding shaft 212a within the second receiving space 212 is penetrated through the second pivotal hole 244, so that the second supporting member 24 is pivotally coupled to the second receiving space 212.

In this embodiment, the first attractable element 235, the second attractable element 236, the third attractable element 245 and the fourth attractable element 246 are iron parts (e.g. iron nails); and the fifth attractable element 211b and the sixth attractable element 212b are magnetic elements (e.g. magnets).

Figure 3:
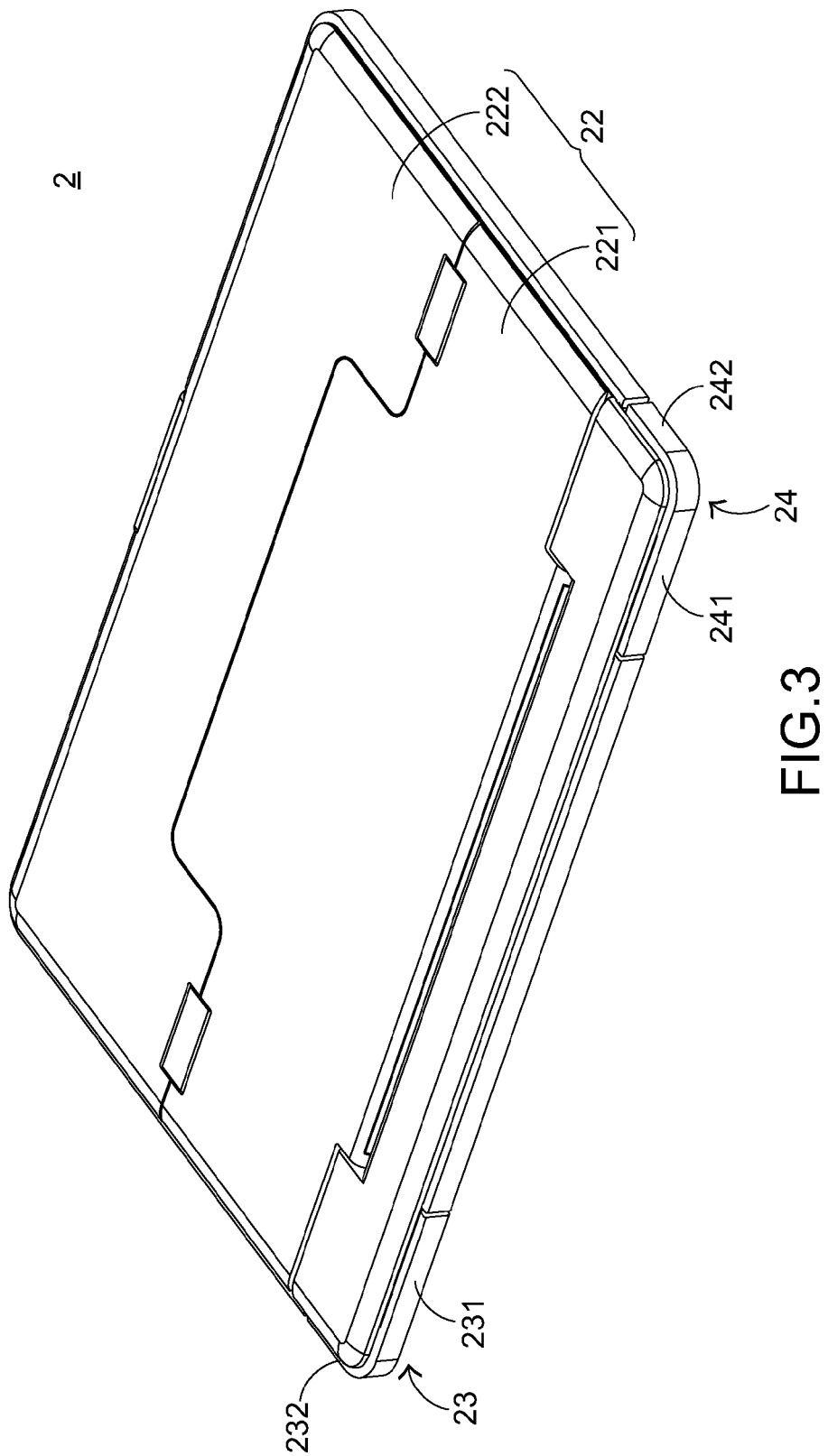
FIG. 3 is a schematic perspective view illustrating the electronic device supporting mechanism in a storing status according to the embodiment of the present invention.
Figure 4:
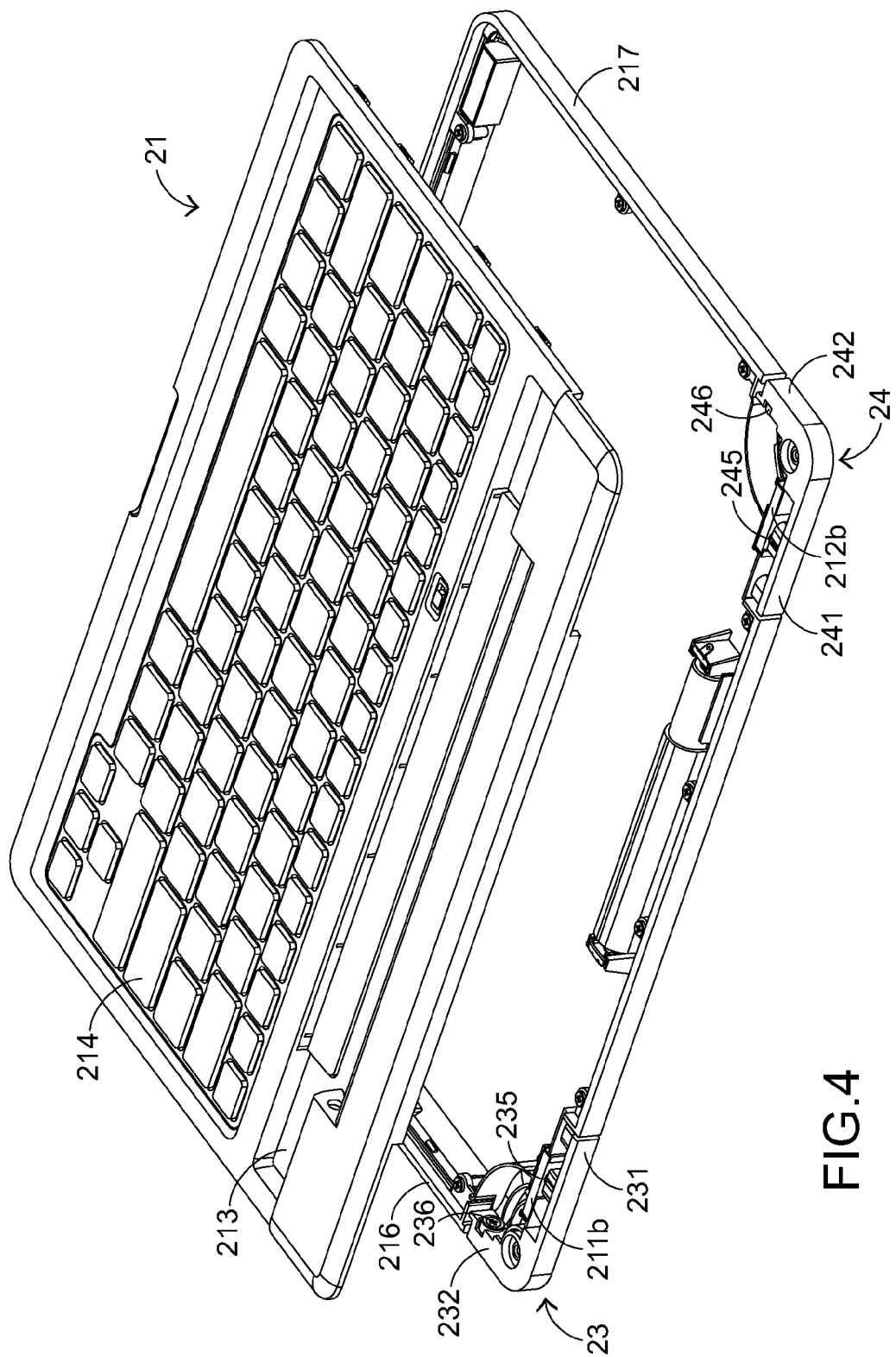
FIG. 4 is a schematic exploded view illustrating the relationship between the base, the first supporting member and the first supporting member of the electronic device supporting mechanism in the storing status according to the embodiment of the present invention.

Hereinafter, the operations of the electronic device supporting mechanism 2 will be illustrated with reference to FIGS. 3 and 4. FIG. 3 is a schematic perspective view illustrating the electronic device supporting mechanism in a storing status according to the embodiment of the present invention. FIG. 4 is a schematic exploded view illustrating the relationship between the base, the first supporting member and the first supporting member of the electronic device supporting mechanism in the storing status according to the embodiment of the present invention. In a case that the electronic device supporting mechanism 2 is in the storing status, the first cover body 221 and the second cover body 222 of the top cover 22 are coplanar to cover the top surface of the base 21. In addition, the first supporting member 23 and the second supporting member 24 are located at a first storing position and a second storing position (see FIG. 4). Meanwhile, the first side plate 231 of the first supporting member 23 is parallel with the first edge 215 of the base 21, and the second side plate 232 of the first supporting member 23 is parallel with the second edge 216 of the base 21. In addition, the first attractable element 235 of the first supporting member 23 is magnetically attracted by the fifth attractable element 211b within the first receiving space 211 in order to avoid loosening the first supporting member 23. The third side plate 241 of the second supporting member 24 is parallel with the first edge 215 of the base 21, and the fourth side plate 242 of the second supporting member 24 is parallel with the third edge 217 of the base 21. In addition, the third attractable element 245 of the second supporting member 24 is magnetically attracted by the sixth attractable element 212b within the second receiving space 212 in order to avoid loosening the second supporting member 24.

Figure 5:
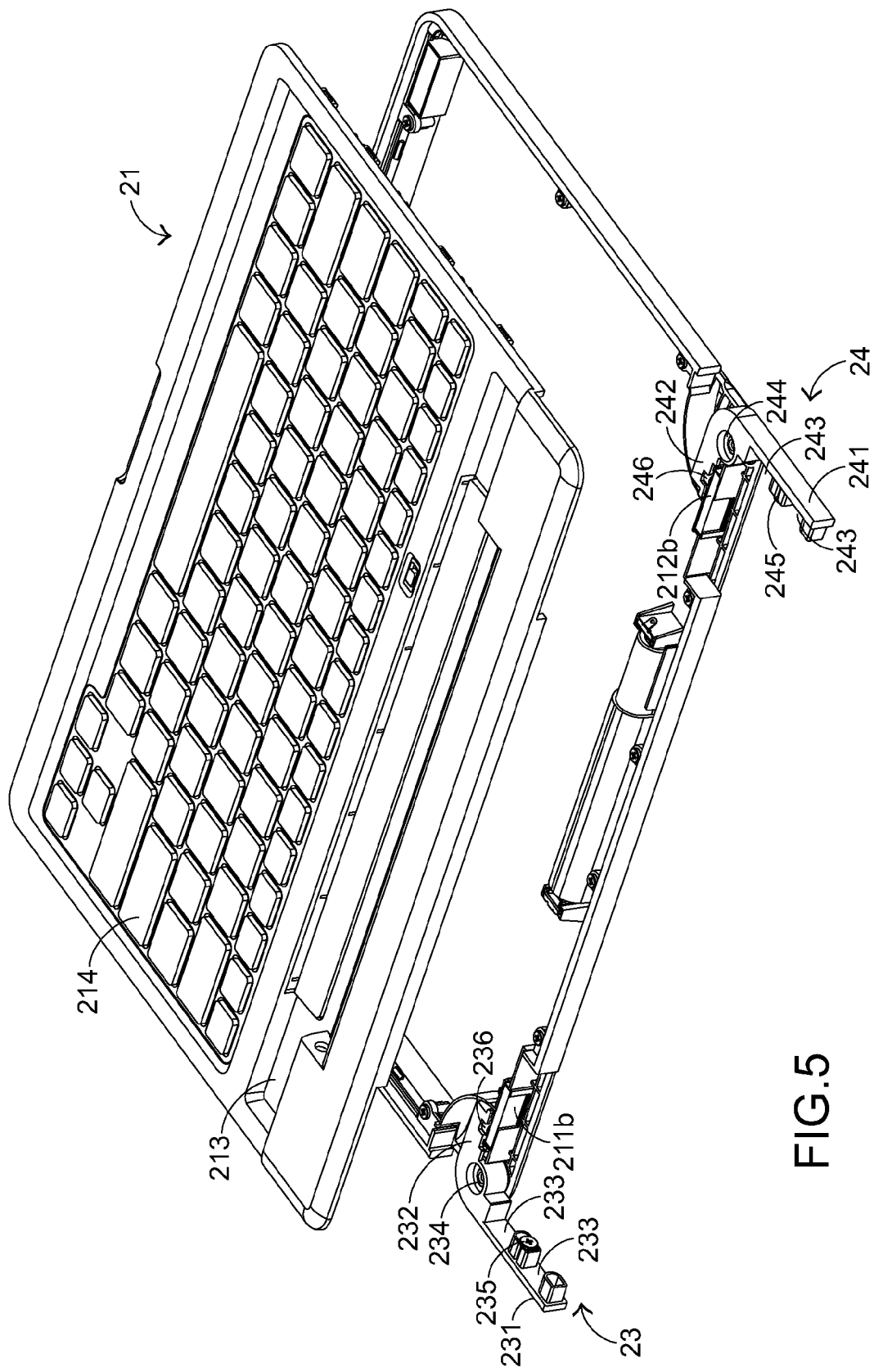
FIG. 5 is a schematic exploded view illustrating the relationship between the base, the first supporting member and the first supporting member of the electronic device supporting mechanism in the supporting status according to the embodiment of the present invention.
Figure 6:
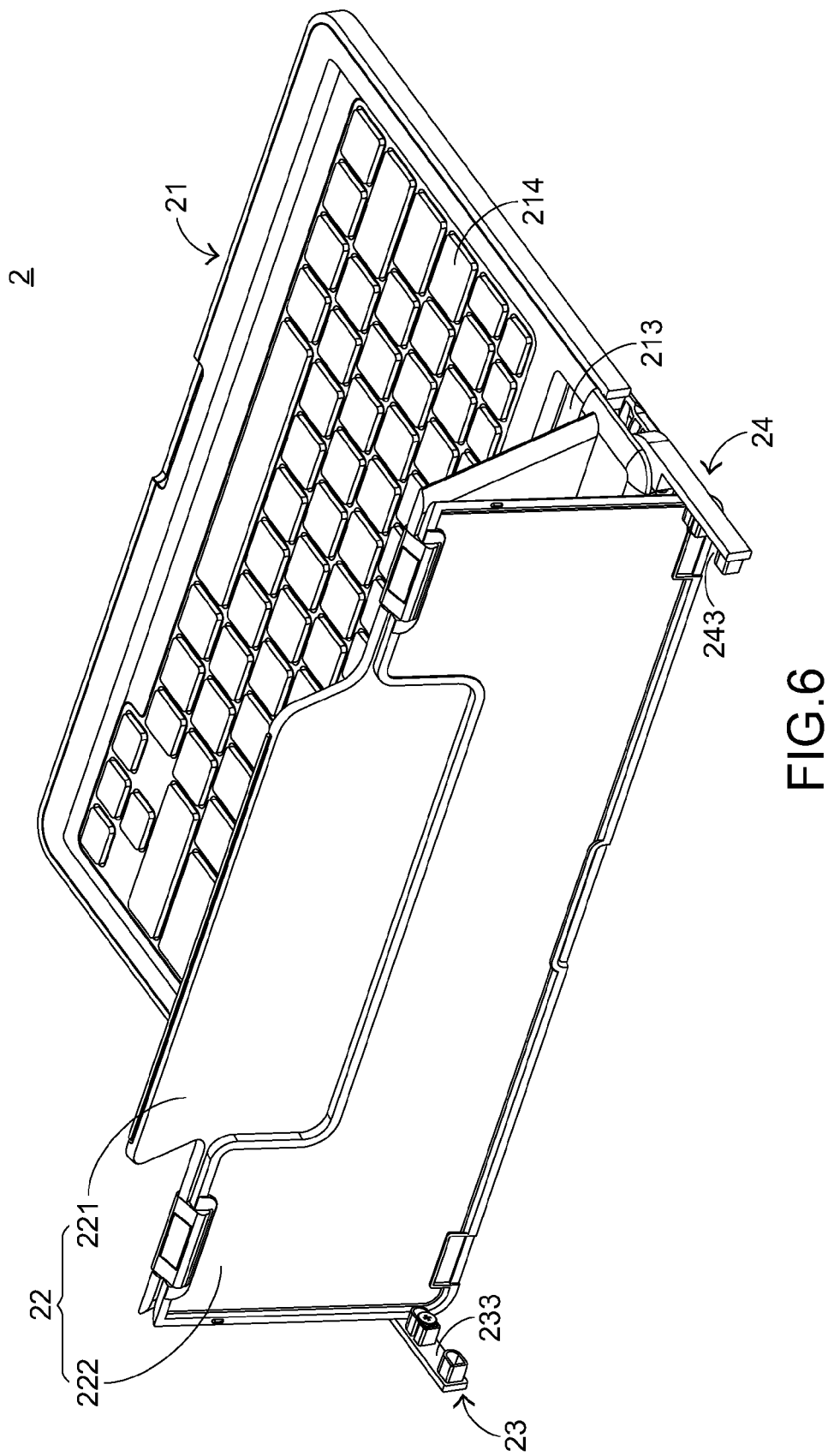
FIG. 6 is a schematic exploded view illustrating the electronic device supporting mechanism at a first supporting angle according to the embodiment of the present invention.
Figure 7:
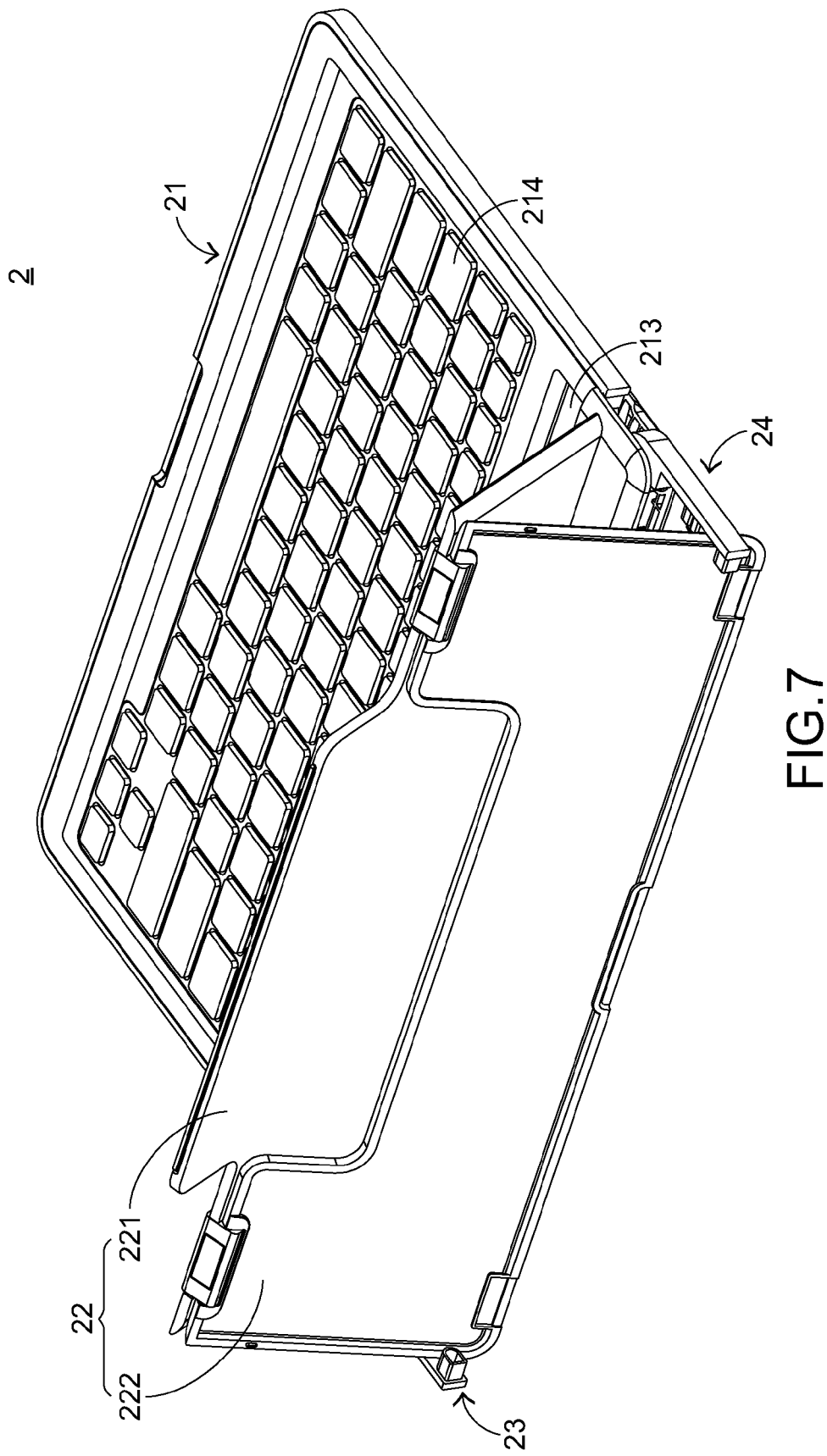
FIG. 7 is a schematic exploded view illustrating the electronic device supporting mechanism at a second supporting angle according to the embodiment of the present invention.

Please refer to FIGS. 5, 6 and 7. FIG. 5 is a schematic exploded view illustrating the relationship between the base, the first supporting member and the first supporting member of the electronic device supporting mechanism in the supporting status according to the embodiment of the present invention. FIG. 6 is a schematic exploded view illustrating the electronic device supporting mechanism at a first supporting angle according to the embodiment of the present invention. FIG. 7 is a schematic exploded view illustrating the electronic device supporting mechanism at a second supporting angle according to the embodiment of the present invention. In a case that a portable electronic device (e.g. a tablet computer) is disposed on the electronic device supporting mechanism 2, the user needs to push against the second side plate 232 of the first supporting member 23 and the fourth side plate 242 of the second supporting member 24. Consequently, the first supporting member 23 and the second supporting member 24 are rotated relative to the base 21 to be respectively located at a first supporting position and a second supporting position (see FIG. 5). Meanwhile, the first side plate 231 of the first supporting member 23 is parallel with the second edge 265 of the base 21, and the second side plate 232 of the first supporting member 23 is parallel with the first edge 215 of the base 21. In addition, the second attractable element 236 of the first supporting member 23 is magnetically attracted by the fifth attractable element 211b within the first receiving space 211 in order to avoid loosening the first supporting member 23. The third side plate 241 of the second supporting member 24 is parallel with the third edge 217 of the base 21, and the fourth side plate 242 of the second supporting member 24 is parallel with the first edge 215 of the base 21. In addition, the fourth attractable element 246 of the second supporting member 24 is magnetically attracted by the sixth attractable element 212b within the second receiving space 212 in order to avoid loosening the second supporting member 24.

After the above process is completed, the front side of the second cover body 222 of the top cover 22 is uplifted, so that the second cover body 222 is rotated relative to the first cover body 221 toward the first edge 215 of the base 21. Correspondingly, the first cover body 221 of the top cover 22 is uplifted through a linking action. That is, the first cover body 221 of the top cover 22 is rotated relative to the base 21 to define a slant surface. Then, according to the desired tilt angle of the first cover body 221, the both ends of the front side of the second cover body 222 of the top cover 22 are respectively inserted into one of the first notches 233 and one of the second notches 243. Consequently, the top cover 22 is fixed by the base 21 (see FIGS. 6 and 7). Afterwards, the portable electronic device is accommodated within the recess 213, and the portable electronic device is leant against the first cover body 221. Under this circumstance, the portable electronic device has the same tilt angle as the first cover body 221.

In the above embodiment, the electronic device supporting mechanism 2 is capable of supporting the electronic device and adjusting the supporting angle by means of the base 21, the top cover 22, the first supporting member 23 and the second supporting member 24.

From the above description, the first supporting member 23 and the second supporting member 24 are disposed within the first receiving space 211 and the second receiving space 212 of the base 21, respectively. Since the first supporting member 23 and the second supporting member 24 have small volume and simple structures, the rotatable spaces of the first supporting member 23 and the second supporting member 24 are not too large. In other words, the first receiving space 211 and the second receiving space 212 will not largely increase the volume of the base 21. Moreover, since the first supporting member 23 and the second supporting member 24 are respectively received within the first receiving space 211 and the second receiving space 212, the top cover 22 can lie flat on the top surface of the base 21 to protect the keyboard 214. In such way, the possibility of damaging the electronic device supporting mechanism 2 during transportation will be minimized, and thus the use life thereof is prolonged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device supporting mechanism, comprising:
    a base comprising a first receiving space and a second receiving space, wherein said first receiving space is located at a corner of a first edge and a second edge of said base, and said second receiving space is located at a corner of said first edge and a third edge of said base, wherein said second edge and said third edge are respectively perpendicular to both ends of said first edge;
    a top cover comprising a first cover body and a second cover body, wherein said first cover body is disposed on said base and rotatable relative to said base, said second cover body is pivotally coupled to said first cover body, and said second cover body is rotatable relative to said first cover body;
    a first supporting member comprising a first side plate, a second side plate a first supporting member notch and a second first supporting member notch, wherein a first angle is defined between said first side plate and said second side plate, said first supporting member notch and said second first supporting member notch are formed in said first side plate, and said first supporting member is pivotally coupled to said first receiving space, so that said first supporting member is rotated to a first supporting position or a first storing position relative to said base and wherein said first supporting member further comprises a first attractable element and a second attractable element, wherein said first attractable element is disposed on said first side plate of said first supporting member, and second attractable element is disposed on said second side plate of said first supporting member; and
    a second supporting member comprising a third side plate, a fourth side plate, a first second supporting member notch and a second second supporting member notch, wherein a second angle is defined between said third side plate and said fourth side plate, said first second supporting member notch and said second second supporting member notch are formed in said third side plate, and said second supporting member is pivotally coupled to said second receiving space, so that said second supporting member is rotated to a second supporting position or a second storing position relative to said base; and
    the second cover body of the top cover is respectively inserted into one of the first notches and one of the second notches to locate the first cover body at a first tilt angle or a second tilt angle.

2. The electronic device supporting mechanism according to claim 1 wherein said first angle and said second angle are both 90 degrees.

3. The electronic device supporting mechanism according to claim 1 wherein a first protruding shaft is further disposed within said first receiving space, and a second protruding shaft is further disposed within said second receiving space, wherein said first protruding shaft is located at a connecting region between said first edge and said second edge of said base, and said second protruding shaft is located at a connecting region between said first edge and said third edge of said base.

4. The electronic device supporting mechanism according to claim 3 wherein said first supporting member further comprises a first pivotal hole, and said second supporting member further comprises a second pivotal hole, wherein said first protruding shaft is penetrated through said first pivotal hole, and said second protruding shaft is penetrated through said second pivotal hole.

5. The electronic device supporting mechanism according to claim 1 wherein when said first supporting member is located at said first supporting position, said first side plate of said first supporting member is parallel with said second edge of said base, and said second side plate of said first supporting member is parallel with said first edge of said base, wherein when said first supporting member is located at said first storing position, said first side plate of said first supporting member is parallel with said first edge of said base, and said second side plate of said first supporting member is parallel with said second edge of said base.

6. The electronic device supporting mechanism according to claim 1 wherein when said second supporting member is located at said second supporting position, said third side plate of said second supporting member is parallel with said third edge of said base, and said fourth side plate of said second supporting member is parallel with said first edge of said base, wherein when said second supporting member is located at said second storing position, said third side plate of said second supporting member is parallel with said first edge of said base, and said fourth side plate of said second supporting member is parallel with said third edge of said base.

7. The electronic device supporting mechanism according to claim 1 wherein said second supporting member further comprises a third attractable element and a fourth attractable element, said third attractable element is disposed on said third side plate of said second supporting member, and said fourth attractable element is disposed on said fourth side plate of said second supporting member.

8. The electronic device supporting mechanism according to claim 7 wherein said first attractable element, said second attractable element, said third attractable element and said fourth attractable element are iron parts.

9. The electronic device supporting mechanism according to claim 7 wherein a fifth attractable element is further disposed within said first receiving space, and a sixth attractable element is further disposed within said second receiving space.

10. The electronic device supporting mechanism according to claim 9 wherein said fifth attractable element and said sixth attractable element are both magnetic elements.

11. The electronic device supporting mechanism according to claim 9 wherein when said first supporting member is located at said first supporting position, said second attractable element is magnetically attracted by said fifth attractable element, wherein when said first supporting member is located at said first storing position, said first attractable element is magnetically attracted by said fifth attractable element.

12. The electronic device supporting mechanism according to claim 9 wherein when said second supporting member is located at said second supporting position, said fourth attractable element is magnetically attracted by said sixth attractable element, wherein when said second supporting member is located at said second storing position, said third attractable element is magnetically attracted by said sixth attractable element.

13. The electronic device supporting mechanism according to claim 1 wherein said base further comprises a recess for receiving an electronic device.

14. The electronic device supporting mechanism according to claim 1 wherein said base further comprises a keyboard.

* * * * *